(12) United States Patent
Park et al.

(10) Patent No.: US 9,799,922 B2
(45) Date of Patent: Oct. 24, 2017

(54) LITHIUM BATTERY

(71) Applicants: SAMSUNG ELECTRONICS CO., LTD., Suwon-si, Gyeonngi-do (KR); NATIONAL UNIVERSITY CORPORATION MIE UNIVERSITY, Tsu, Mie Prefecture (JP)

(72) Inventors: Min-sik Park, Hwaseong-si (KR); Dong-joon Lee, Yongin-si (KR); Sang-bok Ma, Suwon-si (KR); Dong-min Im, Seoul (KR); Won-sung Choi, Yongin-si (KR); Osamu Yamamoto, Tsu (JP); Nobuyuki Imanishi, Tsu (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 64 days.

(21) Appl. No.: 13/975,548

(22) Filed: Aug. 26, 2013

(65) Prior Publication Data
US 2014/0072881 A1 Mar. 13, 2014

(30) Foreign Application Priority Data
Sep. 13, 2012 (KR) .................. 10-2012-0101809

(51) Int. Cl.
*H01M 10/0565* (2010.01)
*H01M 10/052* (2010.01)

(52) U.S. Cl.
CPC ..... *H01M 10/0565* (2013.01); *H01M 10/052* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 5,472,808 A | 12/1995 | Peled et al. | |
| 5,599,355 A * | 2/1997 | Nagasubramanian et al. | .......... 29/623.5 |
| 6,001,509 A * | 12/1999 | Kim | ........... H01M 10/0565 429/129 |
| 6,013,393 A * | 1/2000 | Taniuchi et al. | ............. 429/303 |
| 7,842,421 B2 | 11/2010 | Mikhaylik | |
| 2008/0118826 A1* | 5/2008 | Shimamura et al. | ......... 429/129 |
| 2008/0268327 A1* | 10/2008 | Gordon | ............... H01M 2/1646 429/50 |
| 2009/0162755 A1 | 6/2009 | Neudecker | |
| 2009/0286163 A1* | 11/2009 | Shin et al. | ..................... 429/315 |
| 2010/0285341 A1* | 11/2010 | Yun | ...................... H01M 2/0275 429/94 |

(Continued)

FOREIGN PATENT DOCUMENTS

| | | |
|---|---|---|
| JP | 11-080296 A | 3/1999 |
| JP | 2003-331912 A | 11/2003 |

(Continued)

OTHER PUBLICATIONS

Nakajima, Tsuyoshi, Fluorinated Materials for Energy Conversion, 2005, Elsevier, p. 25.*

(Continued)

*Primary Examiner* — Patrick Ryan
*Assistant Examiner* — Victoria Lynch
(74) *Attorney, Agent, or Firm* — Cantor Colburn LLP

(57) ABSTRACT

A lithium battery including a negative electrode including a lithium metal or a lithium alloy; a positive electrode; and a polymer gel electrolyte contacting the negative electrode, wherein the polymer gel electrolyte has an ionic conductivity of about $10^{-3}$ S/cm or greater, a lithium ion transference number of about 0.15 or greater, and a lithium ion mobility of about $10^{-6}$ cm$^2$/V×sec or greater, wherein the polymer gel electrolyte includes a lithium salt, a polymer capable of forming a complex with the lithium salt, an insulating inorganic filler, and an organic solvent, wherein the organic solvent is inert with respect to the lithium metal, wherein an anionic radius of the lithium salt is about 2.5 Angstroms or greater, and wherein a molecular weight of the lithium salt is about 145 or greater.

13 Claims, 3 Drawing Sheets

(56) References Cited

U.S. PATENT DOCUMENTS

| | | | |
|---|---|---|---|
| 2011/0091777 A1* | 4/2011 | Mizuno | H01M 4/131 |
| | | | 429/403 |
| 2011/0151340 A1 | 6/2011 | Kaskhedikar et al. | |
| 2011/0159376 A1 | 6/2011 | Skotheim et al. | |
| 2011/0165471 A9 | 7/2011 | Skotheim et al. | |
| 2012/0082890 A1* | 4/2012 | Dong | H01M 6/164 |
| | | | 429/188 |
| 2012/0094188 A1 | 4/2012 | Visco et al. | |
| 2012/0237838 A1* | 9/2012 | Uesaka | 429/405 |
| 2013/0209893 A1* | 8/2013 | Archer | H01M 10/052 |
| | | | 429/317 |

FOREIGN PATENT DOCUMENTS

| | | | | |
|---|---|---|---|---|
| JP | 2008226637 A | | 9/2008 | |
| JP | 2010192313 A | * | 9/2010 | H01M 12/06 |
| KR | 19967002190 A | | 3/1996 | |
| KR | 1020060002984 A | | 1/2006 | |

OTHER PUBLICATIONS

Ueno, M, "Effect of Molecular Weight in Compositie Polymer Electrolyte for all Solid Lithium Polymer Battery", 2009, 216th ECS Meeting, Austria.*

Morita, Masayuki, "A Raman Spectroscopic Study of Organic Electrolyte Solutions Based on Binary Solvent Systems of Ethylene Carbonate with Low Viscosity Solvents which Dissolve Different Lithium Salts", J. Chem. Soc., Faraday Trans, 1998, 94, 3451-3456.*

Pan, Chun-yue, "Preparation and Properties of PEO/LiClO4/ KH560-SiO2 Composite Polymer Electrolyte by Sol-Gel Composite In-Situ Method", J. Cent. South Univ. Technol. (2008) 15: 295-300.*

Zhang, XueReng, Quantum Chemical Calculation of the Thermodynamic Potentials for Electrochemical Reduction and Oxidation of Aprotic Solvents, Electrochemical Society Proceedings vol. 2000-21, pp. 499-504.*

English Translation of JP 2010192313.*

* cited by examiner

LITHIUM BATTERY

CROSS-REFERENCE TO RELATED APPLICATIONS

This application claims priority to and the benefit of Korean Patent Application No. 10-2012-0101809, filed on Sep. 13, 2012, and all the benefits accruing therefrom under 35 U.S.C. §119, the content of which is incorporated herein in its entirety by reference.

BACKGROUND

1. Field

The present disclosure relates to lithium batteries.

2. Description of the Related Art

Minimal size, weight, and high energy density are important features of a lithium battery, which make it attractive for use in various appliances. Hence, manufacturing a small high capacity lithium battery is becoming increasingly important. To produce the high capacity lithium battery, a negative electrode material having a high capacity is desired.

A representative example of the negative electrode material for a lithium battery may be a carbon-based material such as graphite. Graphite is a highly stable compound and its volume does not change when it is alloyed with lithium. Graphite has a theoretical electrical capacity of about 372 mAh/g and a large irreversible capacity.

Lithium has a theoretical electrical capacity of 3,860 mAh/g, which is about 10 times greater than that of graphite.

When a lithium metal is used as a negative electrode in a conventional lithium battery, it may degrade when the conventional lithium battery is charged to form a lithium dendrite on a surface of the negative electrode. This degradation leads to a decrease in a lifespan of the lithium battery.

Accordingly, there remains a need for a method of increasing a lifespan of a lithium battery by preventing a formation of the lithium dendrite.

SUMMARY

Provided is a lithium battery having a substantially increased lifespan by including a polymer gel electrolyte having high ion conductivity.

Additional aspects will be set forth in part in the description which follows and, in part, will be apparent from the description, or may be learned by practice of the presented embodiments.

According to an aspect, there is provided a lithium battery, the battery including:
a negative electrode including a lithium metal or a lithium alloy;
a positive electrode; and
a polymer gel electrolyte contacting the negative electrode,
wherein, the polymer gel electrolyte has
an ion conductivity of about $10^{-3}$ Siemens/centimeter or greater,
a lithium ion transference number of about 0.15 or greater, and
a lithium ion mobility of about $10^{-6}$ centimeter$^2$/Volt× second or greater,
wherein, the polymer gel electrolyte includes
a lithium salt,
a polymer capable of forming a complex with the lithium salt, an insulating inorganic filler, and
an organic solvent,
wherein the organic solvent is inert with respect to lithium metal,
wherein an anionic radius of the lithium salt is about 2.5 Angstroms or greater, and
wherein, a molecular weight of the lithium salt is about 145 or greater.

According to an aspect, a lifespan of the lithium battery improves by including a polymer gel electrolyte having high ion conductivity.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
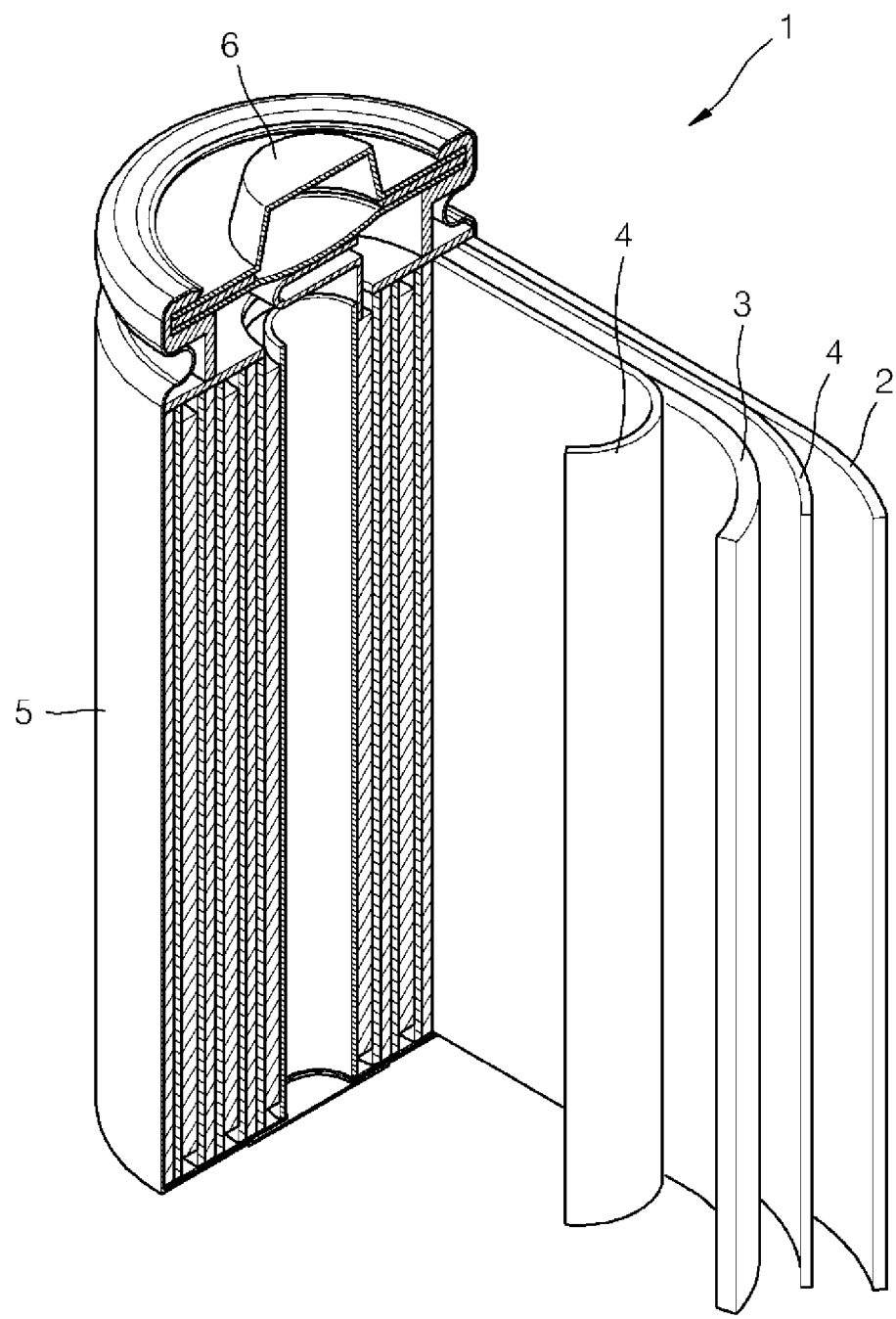
FIG. 1 schematically illustrates a lithium symmetric battery according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or greater of the associated listed items. Expressions such as "at least one of," when preceding a list of elements, modify the entire list of elements and do not modify the individual elements of the list.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a lithium battery will be described in detail according to exemplary embodiments.

A lithium battery according to an embodiment includes
a negative electrode including a lithium metal or a lithium alloy;
a positive electrode; and
a polymer gel electrolyte contacting the negative electrode,
wherein the polymer gel electrolyte has
an ion conductivity of about $10^{-3}$ Siemens per centimeter ("S/cm") or greater,
a lithium ion transference number of about 0.15 or greater, and
a lithium ion mobility of about $10^{-6}$ square centimeters per volt times second ("cm$^2$/V×sec") or greater,
wherein the polymer gel electrolyte includes
a lithium salt,
a polymer capable of forming a complex with the lithium salt,
an insulating inorganic filler, and
an organic solvent,
wherein the organic solvent is inert with respect to lithium metal,
wherein a radius of an anion of the lithium salt is about 2.5 Angstrom ("Å") or greater, and
wherein a molecular weight of the lithium salt is about 145 or greater.

A lifespan of the lithium battery may be substantially increased as including a polymer gel electrolyte having a high ionic conductivity, transference number, and lithium ion mobility prevents a formation of a lithium dendrite during a charge and discharge cycle. Such a battery has a very small increase in overpotential even after repeated charge and discharge cycles. The lithium battery may include a lithium primary battery, a lithium secondary battery, a lithium polymer battery, a lithium battery, and the like.

Also, in the lithium battery, it is desired that the organic solvent be inert with respect to the lithium metal. In other words, it is desired that the organic solvent be chemically and/or electrochemically stable with respect to the lithium metal and/or the lithium alloy during a charge and discharge cycle of the lithium battery.

Also, in the lithium battery, an anionic radius of the lithium salt may be about 2.5 Å or greater. In some embodiments, the anionic radius of the lithium salt may be about 3.0 Å or greater. In other embodiments, the anionic radius of the lithium salt may be about 4.0 Å or greater. For example, the anionic radius of the lithium salt may be about 2.5 Å to about 20 Å. As the anionic radius of the lithium salt increases, the lifespan of a lithium secondary battery may be increased. For example, an anionic radius of a bis(trifluoromethane) sulfonimide ("TFSI") anion may be about 4.39 Å.

The anionic radius ($r_w$) of the lithium salt may be calculated by using Formula 1.

$$V_w = \frac{4}{3}\pi r_w^3 \qquad \text{Formula 1}$$

In Formula 1 above, $V_w$ is a Van der Waals volume of the anion.

A molecular weight of the lithium salt of the lithium battery may be about 145 or greater. In some embodiments, the molecular weight of the lithium salt may be about 200 or greater. In other embodiments, the molecular weight of the lithium salt may be about 250 or greater. For example, the molecular weight of the lithium salt may be about 145 to about 2,000.

When the molecular weight of the lithium salt is too low or too high, the lifespan of the lithium battery may be decreased.

For example, propylene carbonate (4-methyl-1,3-dioxolan-2-one), an organic solvent for the conventional lithium battery, may not be used in the instant lithium battery because the propylene carbonate is highly reactive with respect to the lithium metal and may be easily decomposed during a charge and discharge process. In some embodiments, a reduction potential of the organic solvent in an aqueous solution with respect to a lithium metal may be −0.5 V or less. For example, the reduction potential of the organic solvent in the aqueous solution with respect to the lithium metal may be about −0.5 V to about −2.0 V.

The organic solvent of the lithium battery may have a viscosity of about 0.02 Pascal times second ("Pa×s") or less at a concentration of the lithium salt of 1.5 M or less and at a temperature of 21° C. In some embodiments, the organic solvent may have a viscosity of about 0.015 Pa×s or less at a concentration of the lithium salt of 1.5 M or less and at a temperature of 21° C. In other embodiments, the organic solvent may have a viscosity of about 0.01 Pa×s or less at a concentration of lithium salt of 1.5 M or less and at a temperature of 21° C. For example, the organic solvent may have a viscosity of about 0.0001 Pa×s to about 0.02 Pa×s at a concentration of the lithium salt of 1.5 M or less and at a temperature of 21° C. When the viscosity of the organic solvent is too high, the lifespan of the lithium battery may be decreased.

The organic solvent of the lithium battery may have an ionic conductivity of 0.18 milliSiemens per centimeter ("mS/cm") or greater at a concentration of the lithium salt of 1.5 M or less and at a temperature of 21° C. In some embodiments, the organic solvent may have an ionic conductivity of about 0.2 mS/cm or greater at a concentration of the lithium salt of 1.5 M or less and at a temperature of 21° C. In other embodiments, the organic solvent may have an ionic conductivity of about 0.5 mS/cm or greater at a concentration of the lithium salt of 1.5 M or less and at a temperature of 21° C. When the ionic conductivity of the organic solvent is too low, the lifespan of the lithium battery may be decreased because of the increase in the resistance of the polymer gel electrolyte.

The organic solvent of the lithium battery that is inert with respect to lithium metal may be, for example, at least one selected from 1,4-dioxane, triethylamine ("TEA"), diisopropylethylamine ("DIPEA"), 1,2-dimethoxyethane ("DME"), 1,2-diethoxyethane ("DEA"), diethyl ether, diglyme, triglyme, tetrahydropyran, diisopropyl ether, methylbutyl ether, tetraglyme, 1,3-dioxolane, tetrahydrofuran ("THF"), 2-methyltetrahydrofuran ("2-methyl-THF"), 2,2-dimethyltetrahydrofuran ("2,2-dimethyl-THF"), 2,5-dimethyltetrahydrofuran ("2,5-dimethyl-THF"), hexamethylphosphoric triamide ("HMPA"), o-dimethoxybenzene, diethyl carbonate, methyl ethyl carbonate, anisole, dimethyl carbonate, N,N-diethylacetamide ("DEA") and tetramethylurea ("TMU").

The lithium salt may be, for example, at least one selected from $Li(FSO_2)_2N$, $Li(CF_3SO_2)_2N$, $Li(C_2F_5SO_2)_2N$, $LiN(C_pF_{2p+1}SO_2)(C_qF_{2q+1}SO_2)$ (wherein p and q are different from each other, and p and q are each independently an integer of 1 to 20), $LiN((SO_2)_2C_pF_{2p})$ (wherein p is an integer of 1 to 10), $Li(C_6F_5SO_2)_2N$, $Li(C_{10}F_7SO_2)_2N$, $Li(C_6F_5SO_2)(C_{10}F_7SO_2)N$, $LiN(C_6F_5SO_2)(C_pF_{2p+1}SO_2)$ (wherein p is an integer of 1 to 10), $LiN(C_{10}F_7SO_2)(C_pF_{2p+1}SO_2)$ (wherein p is an integer of 1 to 10), $LiC_4F_9SO_3$, $Li(CF_3SO_2)_3C$, $Li(C_6H_5)_4B$, and $LiC_4BO_8$.

In the lithium battery, the concentration of the lithium salt may be about 0.01 M to about 10 M; however, the concentration is not limited thereto and may be suitably changed according to a desired use of the lithium battery. For example, the concentration of the lithium salt in the lithium battery may be about 0.5 M to about 5 M.

When the concentration of the lithium salt is too high, the viscosity of the electrolyte solution increases, thereby decreasing the lifespan of the lithium battery, and when the concentration of the lithium salt is too low, the resistance of an organic electrolyte solution may increase.

In the lithium battery, the polymer may be any polymer capable of forming a complex with (i.e., that forms a complex with or coordinates to) a lithium salt. The polymer may act as a solid electrolyte by forming the complex with the lithium salt. For example, the polymer may be at least one selected from a polyethylene oxide, a polypropylene, a polyacrylonitrile, a polyvinylidene-fluoride, a polymethylmethacrylate, and the like. Any of the foregoing polymers may contain units derived from other monomers. For example, the polymer may be a poly(ethylene oxide), a poly(propylene oxide), a poly(ethylene oxide)(propylene oxide), a poly(methylmethacrylate)(n-hexylmethacrylate), and the like.

A molecular weight of the polymer may be about $1 \times 10^5$ to about $1 \times 10^7$; however, the molecular weight is not limited thereto and may be suitably changed according to the desired use of the lithium battery.

A diameter of the insulating inorganic filler of the lithium battery may be about 100 nanometers ("nm") or less. In some embodiments, the diameter of the insulating inorganic filler may be about 50 nm or less. In other embodiments, the diameter of the insulating inorganic filler may be about 1 to about 50 nm. In still other embodiments, the insulating inorganic filler may be about 1 to about 25 nm. When the diameter of the insulating inorganic filler is too large, its specific surface area may be decreased.

In the lithium battery, an amount of the insulating inorganic filler may be about 10 percent by weight ("weight %") or less based on a total weight of the polymer, the lithium salt, and the inorganic filler. In some embodiments, the amount of the insulating inorganic filler in the lithium battery may be about 8 weight % or less based on the total weight of the polymer, the lithium salt, and the inorganic filler. In other embodiments, the amount of the insulating inorganic filler in the lithium battery may be about 6 weight % or less based on the total weight of the polymer, the lithium salt, and the inorganic filler. In still other embodiments, the amount of the insulating inorganic filler in the lithium battery may be about 1 weight % to about 10 weight % based on the total weight of the polymer, the lithium salt, and the inorganic filler. When the amount of the inorganic filler is too high, the ion conductivity thereof may decrease, and when the amount of the inorganic filler is too low, the ion conductivity thereof may also be low.

In the lithium battery, the insulating inorganic filler may be at least one selected from $SiO_2$, $BaTiO_3$, $TiO_2$, $Al_2O_3$, and $Li_2CO_3$. For example, the insulating inorganic filler may be $SiO_2$.

In the lithium battery, the polymer gel electrolyte may have an ionic conductivity of $2 \times 10^{-3}$ S/cm or greater, a lithium ion transference number of 0.16 or greater, and a lithium ion mobility of $1.1 \times 10^{-6}$ cm$^2$/V×sec or greater.

In the lithium battery, a thickness of the polymer gel electrolyte may be about 10 micrometers ("μm") to about 200 μm, in some embodiments about 10 μm to about 150 μm, and in other embodiments about 50 μm to about 150 μm.

When the thickness of the polymer gel electrolyte is too low, it may be difficult to manufacture the lithium battery, and when the thickness of the polymer is too high, the ion conductivity thereof may be too low.

In the lithium battery, a separator disposed between the positive electrode and the negative electrode may further be included. For example, a layer including the polymer gel electrolyte may be disposed on at least one surface of the separator. Alternatively, the layer including the polymer gel electrolyte may be disposed on both sides of the separator. The lifespan of the lithium battery may be increased by further including the separator.

The positive electrode and the negative electrode of the lithium battery may be each a lithium metal and an overpotential of the lithium battery may be about 0.2 V or less after 100 cycles of charge and discharge under a condition of a constant current of about 3 milliAmpere per square centimeter ("mA/cm$^2$") for about 4 hours per charge or discharge and at a temperature of about 60° C. The lithium battery may have an overpotential of about 0.1 V or less after 100 cycles of charge and discharge under the conditions mentioned above. The lithium battery may have an overpotential of about 0.05 V or less after 100 cycles of charge and discharge under the conditions mentioned above. The lithium battery may have an overpotential of about 0.03 V or less after 100 cycles of charge and discharge under the conditions mentioned above. Hence, the lifespan of the lithium battery may be substantially increased because actual polarization of the lithium battery is minimized to about 0.2 V or less even after a long period of charge and discharge.

In the lithium battery, the positive electrode may include positive electrode materials other than TiS$_2$, LiMnO$_2$, V$_2$O$_5$, CoS$_x$ (wherein, 0.8<x<4.5), NiS$_x$ (wherein, 0.8<x<4.5), V$_3$O$_{16}$, FeS, and FeS$_2$. Also, in the lithium battery, the positive electrode may include positive electrode materials other than LiCoO$_2$ and LiMn$_2$O$_4$. Hence, the lithium battery may include positive electrode materials other than the positive electrode materials above.

Lithium Polymer Battery

The lithium battery may be a conventional lithium polymer battery.

The lithium polymer battery may include a positive electrode including
a positive electrode material;
a negative electrode including a lithium metal and/or a lithium alloy; and optionally,
a separator, and
a polymer gel electrolyte contacting the negative electrode.

The polymer gel electrolyte may be formed on one surface or on both surfaces of the separator.

A lifespan of the lithium polymer battery may be increased by including the polymer gel electrolyte having high ionic conductivity.

The lithium polymer battery may be, for example, manufactured by the following method:

First, a positive electrode plate is prepared.

A positive electrode composition is prepared by mixing a positive electrode material, a conductor, a binder, and a solvent. After preparing the positive electrode plate by directly coating and drying the positive electrode material composition on an aluminum current collector or by casting the positive electrode material composition on a separate scaffold, a positive electrode active material film is separated from the scaffold and laminated on the aluminum current collector to prepare the positive electrode plate. Alternatively, the positive electrode composition may be prepared in an electrode ink form including an excess amount of solvent and be printed in an inkjet form or a Gravure form on the scaffold to manufacture the positive electrode plate.

A printing method is not limited to the method described above and any method that may be used in a general coating and printing may be used.

The positive electrode material used in a cathode may be any positive electrode material generally used in a lithium battery. For example, the positive electrode material may be a lithium transition metal oxide, a transition metal sulfide, and the like.

For example, the positive electrode material may be at least one complex oxide of lithium and a metal selected from cobalt (Co), nickel (Ni), and a combination thereof, and more particularly, a compound represented by at least one Formula of Li$_a$A$_{1-b}$B$_b$D$_2$ (wherein, 0.90≤a≤1.8, and 0≤b≤0.5); Li$_a$E$_{1-b}$B$_b$O$_{2-c}$D$_c$ (wherein, 0.90≤a≤1.8, 0≤b≤0.5, 0≤c≤0.05); LiE$_{2-b}$B$_b$O$_{4-c}$D$_c$ (wherein, 0≤b≤0.5, 0≤c≤0.05); Li$_a$Ni$_{1-b-c}$Co$_b$B$_c$D$_\alpha$ (wherein, 0.90≤a≤1.8, 0≤b≤0.5, 0≤c≤0.05, 0<α≤2); Li$_a$Ni$_{1-b-c}$Co$_b$B$_c$O$_{2-\alpha}$F$_\alpha$ (wherein, 0.90≤a≤1.8, 0≤b≤0.5, 0≤c≤0.05, 0<α<2); Li$_a$Ni$_{1-b-c}$Co$_b$B$_c$O$_{2-\alpha}$F$_2$ (wherein, 0.90≤a≤1.8, 0≤b≤0.5, 0≤c≤0.05, 0<α<2); Li$_a$Ni$_{1-b-c}$Mn$_b$B$_c$D$_\alpha$ (wherein, 0.90≤a≤1.8, 0≤b≤0.5, 0≤c≤0.05, 0<α≤2); Li$_a$Ni$_{1-b-c}$Mn$_b$B$_c$O$_{2-\alpha}$F$_\alpha$ (wherein, 0.90≤a≤1.8, 0≤b≤0.5, 0≤c≤0.05, 0<α<2); Li$_a$Ni$_{1-b-c}$Mn$_b$B$_c$O$_{2-\alpha}$F$_2$ (wherein, 0.90≤a≤1.8, 0≤b≤0.5, 0≤c≤0.05, 0<α<2); Li$_a$Ni$_b$E$_c$G$_d$O$_2$ (wherein, 0.90≤a≤1.8, 0≤b≤0.9, 0≤c≤0.5, 0.001≤d≤0.1); Li$_a$Ni$_b$Co$_c$Mn$_d$GeO$_2$ (wherein, 0.90≤a≤1.8, 0≤b≤0.9, 0≤c≤0.5, 0≤d≤0.5); Li$_a$NiG$_b$O$_2$ (wherein, 0.90≤a≤1.8, 0.001≤b≤0.1.); Li$_a$CoG$_b$O$_2$ (wherein, 0.90≤a≤1.8, 0.001≤b≤0.1); Li$_a$MnG$_b$O$_2$ (wherein, 0.90≤a≤1.8, 0.001≤b≤0.1); Li$_a$Mn$_2$G$_b$O$_4$ (wherein, 0.90≤a≤1.8, 0.001≤b≤0.1); QO$_2$; QS$_2$; LiQS$_2$; V$_2$O$_5$; LiV$_2$O$_5$; LiIO$_2$; LiNiVO$_4$; Li$_{(3-f)}$J$_2$(PO$_4$)$_3$ (wherein 0≤f≤2); Li$_{(3-f)}$Fe$_2$(PO$_4$)$_3$ (wherein 0≤f≤2); and LiFePO$_4$.

In the Formula above, A is Ni, Co, manganese (Mn), or a combination thereof; B is aluminum (Al), Ni, Co, Mn, chromium (Cr), iron (Fe), strontium (Sr), vanadium (V), or a combination thereof; D is oxygen (O), fluorine (F), sulfur (S), phosphorus (P), or a combination thereof; E is Co, Mn, or a combination thereof; F is F, S, P, or a combination thereof; G is Al, Cr, Mn, Fe, magnesium (Mg), lanthanum (La), Cerium (Ce), Sr, V, or a combination thereof; Q is titanium (Ti), molybdenum (Mo), Mn, or a combination thereof; I is Cr, V, Fe, scandium (Sc), yttrium (Y), or a combination thereof; J is V, Cr, Mn, Co, Ni, copper (Cu), or a combination thereof. For example, LiMnO$_2$, LiNi$_{1-x}$Mn$_x$O$_{2x}$ (wherein 0<x<1), Ni$_{1-x-y}$Co$_x$Mn$_y$O$_2$ (wherein 0≤x≤0.5, 0≤y≤0.5), LiFePO$_4$, TiS$_3$, FeS$_3$, and the like may be used as the positive electrode material.

However, TiS$_2$, LiMnO$_2$, V$_2$O$_5$, CoS$_x$ (wherein 0.8<x<4.5), NiS$_x$ (wherein 0.8<x<4.5), V$_3$O$_{16}$, FeS, FeS$_2$, LiCoO$_2$ and LiMn$_2$O$_4$ may be excluded from the positive electrode material.

Examples of the conducting agent include carbons, such as carbon black, activated carbon, graphite particulate, natural graphite, artificial graphite, acetylene black, carbon fiber, carbon nanofiber, carbon nanowire, carbon nanotube, carbon nanohorn, carbon nanoring, carbon aerogel, carbon cryogel, mesocarbon, and mesocarbon microbead.

Examples of the conducting agent may also include a metal, such as metal powder, metal tube, or metal fiber of copper, nickel, aluminum, and silver.

In addition, examples of the conducting agent may include a conductive polymer such as a polyphenylene or a polyphenylene derivative, but are not limited thereto.

As a binder, vinylidene fluoride/hexafluoropropylene copolymer, polyvinylidene fluoride, polyacrylonitrile, polymethylmethacrylate, polytetrafluoroethylene ("PTFE"), and a combination thereof, or polyimide, polyamide-imide, styrene butadiene rubber-based polymer, acrylate-based rubber, sodium carboxymethylcellulose, and the like may be used, and as a solvent, dimethylsulfoxide ("DMSO"), N,N-dimethylformamide ("DMF"), N,N-dimethylacetamide ("DMA"), N-methylpyrrolidone ("NMP"), acetone, methylethyl ketone, or water may be used.

The amounts of the positive electrode material, the conducting agent, the binder, and the solvent may be at a level generally used in the art.

Thereafter, a negative electrode plate is prepared.

In the negative electrode, a negative electrode material may be a lithium metal, an alloy including the lithium metal, or a lithium intercalating compound; however, the negative electrode material is not limited thereto and any suitable material capable of intercalating lithium may be used. Because the negative electrode material determines the capacity of the lithium polymer battery, the negative electrode material may be, for example, the lithium metal. The alloy including the lithium metal may be, for example, an alloy of lithium with Al, Sr, Mg, indium (In), calcium (Ca), Ti, V, and the like. A lithium metal sheet may be used as the negative electrode. In the negative electrode, a negative electrode material may also be a carbonaceous material such as a graphite.

Alternatively, the negative electrode plate may be manufactured into a negative electrode active material composition by mixing a negative electrode active material, the conductor, the binder, and the solvent, as in the case of the positive electrode plate. The negative electrode plate may be obtained by directly coating and drying the negative electrode active material composition on a copper current collector or by casting the negative electrode active material composition on a separate scaffold, separating a negative electrode active material film from the scaffold, and laminating the negative electrode active material film. Alternatively, the negative electrode active material composition may be prepared in an electrode ink form including an excess amount of solvent and printed in an inkjet form or a Gravure form on the scaffold to prepare the negative electrode plate. A printing method is not limited to the methods described above and all methods suitable for a general coating and printing may be used. The conductor, the binder, and the solvent may be the same as those used in preparing the positive electrode polar plate. The amounts of the negative electrode active material, the conductor, and the binder may be at a level generally used.

Also, a hole may be formed inside a polar plate by adding a plasticizer to the positive electrode material composition and the negative electrode material composition.

Thereafter, a separator may be optionally prepared.

The positive electrode and the negative electrode may be separated by the separator, and any separator generally used in a lithium battery may be used herein. A separator having suitably low resistance with respect to an ion mobility of the polymer gel electrolyte and having an excellent ability to impregnate the polymer gel electrolyte may be used herein. For example, the separator may be manufactured from glass fiber, polyester, polyethylene, polypropylene, polytetrafluoroethylene ("PTFE"), or a combination thereof, and the separator may be a non-woven fabric or a woven fabric. In a greater detail, in a lithium ion battery, a separator capable of wrapping may be used, and in a lithium ion polymer battery, a separator having an excellent ability to impregnate an organic electrolyte may be used herein.

The separator may be manufactured according to the following method. After preparing a separator composition by mixing a polymer resin, a filler, and a solvent, a separator film is formed by directly coating and drying the separator composition on an electrode or by casting the separator composition on a scaffold and laminating a separator film separated from the scaffold on the electrode.

The polymer resin is not limited and any suitable material used as a binder for a polar plate may be used. For example, vinylidene fluoride/hexafluoropropylene copolymer, polyvinylidene fluoride ("PVDF"), polyacrylonitrile, polymethylmethacrylate, or a combination thereof may be used. Using vinylidene fluoride/hexafluoropropylene copolymer having about 8 to about 25 weight % is optimal.

Thereafter, the polymer gel electrolyte is prepared.

A solid polymer gel electrolyte may be prepared by dissolving a polymer powder and a lithium salt in a solvent, dispersing the insulating inorganic filler to prepare a slurry, and casting and drying the slurry on a substrate to prepare a polymer gel electrolyte in a solid form. The polymer gel electrolyte may be in a sheet form. The polymer gel electrolyte may be located in such a way that the polymer gel electrolyte contacts the negative electrode polar plate.

As shown in FIG. 1, a lithium polymer battery 1 includes a positive electrode 3, a negative electrode 2, and a polymer gel electrolyte 4 contacting the negative electrode 2. The positive electrode 3, the negative electrode 2, and the polymer gel electrolyte 4 are wound or folded to be included in a battery case 5. Thereafter, an organic electrolyte is injected into the battery case 5 and sealed as a cap assembly 6 to manufacture the lithium polymer battery 1.

Although not shown in FIG. 1, a battery structure may be formed by additionally locating a separator between the positive electrode 3 and the polymer gel electrolyte 4. A battery pack is formed by laminating a plurality of the battery structures, and the battery pack may be used in all devices requiring high capacity and high output. For example, the battery pack may be used in notebooks, smartphones, and electric vehicles ("EVs").

Also, a lithium polymer battery may be used in EVs because the lithium polymer battery has high capacity and an excellent lifespan. For example, the lithium polymer battery may be used in hybrid vehicles such as plug-in hybrid electric vehicles ("PHEV"). Also, the lithium polymer battery may be used in the arts requiring a large amount of electricity storage such as an electricity storage system ("ESS") and the like.

Lithium Air Battery

The lithium battery may be a lithium air battery.

The lithium air battery includes a positive electrode that uses air as a positive electrode active material; a negative electrode including a lithium metal and/or a lithium alloy; and optionally, a separator, and the polymer gel electrolyte contacting the negative electrode. The polymer gel electrolyte may be formed on one surface or both surfaces of the separator.

A lifespan of the lithium air battery may be increased by including the polymer gel electrolyte contacting the negative electrode.

The lithium air battery including the polymer gel electrolyte is the same as the lithium polymer battery described above, except that the positive electrode of the lithium air battery uses air as the positive electrode active material.

The lithium air battery may be manufactured by the following method:

First, the positive electrode using air as the positive electrode active material is prepared.

The positive electrode may be prepared by adding a suitable amount of solvent to a mixture of an oxygen oxidation/reduction catalyst, a conductor, and a binder to prepare a positive electrode slurry, coating and drying the positive electrode slurry on a surface of a current collector, and optionally compression molding the positive electrode slurry on the current collector to improve an electrode density. Also, the oxygen oxidation/reduction catalyst may optionally be omitted.

The conductor material may be porous. Accordingly, any conductor material having suitable porosity and conductivity may be used, for example, a carbon-based material having suitable porosity may be used. The carbon-based material may include carbon black, graphite, graphene, active carbon, carbon fiber, and the like. Also, a metal conductive material such as metal fiber, metal mesh, and the like may be used. Also, metal powder such as copper, silver, nickel, aluminum, and the like may be included. An organic conductive material such as a polyphenylene derivative and the like may be used. The organic conductive material may be used alone or as a mixture with another conductive material.

The oxygen oxidation/reduction catalyst may be a precious metal-based catalyst such as platinum, gold, silver, palladium, ruthenium, rhodium, osmium, and the like, or an oxide-based catalyst such as manganese oxide, iron oxide, cobalt oxide, nickel oxide, and the like; however, the oxygen oxidation/reduction catalyst is not limited thereto and any catalyst suitable for oxygen oxidation/reduction used in the art may be used herein. The oxygen oxidation/reduction catalyst may optionally be omitted.

Also, the oxygen oxidation/reduction catalyst may be deposited on a support. The support may be an oxide, a zeolite, a clay-based mineral, carbon, and the like. The oxide may include at least one of alumina, silica, zirconium oxide, titanium dioxide, and the like. The oxide may include at least one metal selected from cerium (Ce), praseodymium (Pr), samarium (Sm), europium (Eu), terbium (Tb), thulium (Tm), ytterbium (Yb), stibium (Sb), bismuth (Bi), vanadium (V), chromium (Cr), manganese (Mn), iron (Fe), cobalt (Co), nickel (Ni), copper (Cu), niobium (Nb), molybdenum (Mo), and tungsten (W). The carbon may be carbon black such as Ketjen black, acetylene black, channel black, lamp black, and the like, graphite such as natural graphite, artificial graphite, expendable graphite, active carbon and carbon fiber; however, the support is not limited thereto and any suitable material used in the art as a support may be used herein.

The binder may include a thermoplastic polymer or a thermosetting polymer. Examples of the thermoplastic or thermosetting polymer include, polyethylene ("PE"), polypropylene ("PP"), polyvinylidene fluoride ("PVDF"), styrene-butadiene rubber, tetrafluoroethylene-perfluoroalkylvinylether copolymer, vinylidene fluoride-hexafluoropropylene copolymer, vinylidene fluoride-chlorotrifluoroethylene, vinylidene fluoride-pentafluoropropylene copolymer, propylene-tetrafluoroethylene copolymer, ethylene-chlorotrifluoroethylene copolymer, vinylidene fluoride-hexafluoropropylene-tetrafluoroethylene copolymer, vinylidene fluoride-perfluoromethylvinylether-tetrafluoroethylene copolymer, ethylene-acrylic acid copolymer, reactive ethylene terpolymer ("RET", a reactive terpolymer of ethylene, butyl acrylate, and glycidyl methacrylate), acrylonitrile butadiene-styrene copolymer ("ABS"), polymethyl methacrylate ("PMMA"), methyl pentene polymer (poly(4-methyl-1-pentene), "MPP"), polyimide ("PI"), polyetherimide ("PEI"), polyvinylidene chloride ("PVDC"), polycarbonate ("PC"), polystyrene ("PS"), nylon (polyamide, "PA"), polyethylene terephthalate ("PETP"), polyphenylene oxide ("PPO"), polyvinyl chloride ("PVC"), celluloid polymer, cellulose acetate, cyclic olefin copolymer ("COC"), ethylene vinyl acetate ("EVA"), ethylene vinyl alcohol, ("EVOH"), fluoropolymers (such as polytetrafluoroethylene "PTFE", fluorinated ethylene propylene "FEP", perfluoroalkoxy "PFA", chlorotrifluoroethylene "CTFE", ethylene chlorotrifluoroethylene "ECTFE", and ethylene tetrafluoroethylene "ETFE"), liquid crystal polymer ("LCP"), polyoxymethylene ("POM"), polyacrylates, polyacrylonitrile ("PAN"), polyamide imide ("PAI"), polyaryletherketone ("PAEK"), polybutadiene ("PBD"), polybutylene ("PB"), polybutylene terephthalate ("PBT"), polycyclohexylene dimethylene terephthalate ("PCT"), polyhydroxyalkanoates ("PHAs"), polyketone ("PK"), polyester, polyetheretherketone ("PEEK"), polyetherketoneketone ("PEKE"), polyethersulfone ("PES"), chlorinated polyethylene ("CPE"), polylactic acid ("PLA"), polyphenylene sulfide ("PPS"), polyphthalamide ("PPA"), polysulfone ("PSU"), polytrimethylene terephthalate ("PTT"), polyurethane ("PU"), polyvinyl acetate ("PVA"), polyvinylidene chloride ("PVDC"), styrene acrylonitrile ("SAN"), and the like may be used alone or as a mixture; however, the binder is not limited thereto. The binder may be omitted.

The current collector may use a porous material having a net or a mesh form to rapidly diffuse oxygen and may use a porous metallic plate such as stainless steel, Ni, and aluminum and the like; however, the current collector is not limited thereto and any suitable material used as the current collector in the art may be used herein. The current collector may be coated with an oxidation resistant metal or an alloy film to prevent oxidation.

Thereafter, the negative electrode including the lithium metal and/or the lithium alloy may be prepared.

As the negative electrode, the lithium metal, a lithium-based alloy, or a material capable of intercalating and deintercalating lithium may be used; however, the negative electrode is not limited thereto and any suitable material including lithium or capable of intercalating and deintercalating that may be used as the negative electrode in the art may be used herein. Because the negative electrode determines the capacity of the lithium air battery, the negative electrode may be, for example, the lithium metal. The lithium-based alloy may be, for example, an alloy of lithium and aluminum, strontium, magnesium, indium, calcium, titanium, V, and the like. A form of the negative electrode is not particularly limited. For example, the negative electrode may be in a sheet form.

Thereafter, the polymer gel electrolyte contacting the negative electrode is prepared.

A solid polymer gel electrolyte may be prepared by dissolving a polymer powder and a lithium salt in a solvent, dispersing the insulating inorganic filler to prepare a slurry, and casting and drying the slurry on a substrate to prepare a polymer gel electrolyte in a solid form. The polymer gel electrolyte may be in a sheet form.

Thereafter, the separator disposed between the positive electrode and the negative electrode is prepared.

When the separator is suitable for an operating range of the lithium air battery, the separator is not limited to a particular material. For example, the separator may be a polymer non-woven fabric such as a polypropylene non-woven fabric, a polyphenylene sulfide non-woven fabric, and a combination thereof. The separator in the lithium air battery may be prepared in the same manner as in the lithium polymer battery. In some embodiments, the separator may be omitted.

Also, the lithium air battery may further include a liquid organic electrolyte.

The liquid organic electrolyte may be additionally included between the separator and the positive electrode or between the polymer gel electrolyte and the positive electrode.

The liquid organic electrolyte may include an aprotic solvent. As the aprotic solvent, a carbonate, an ester, an ether, a ketone, an amine, or a phosphine solvent may be used. As the carbonate solvent, dimethyl carbonate ("DMC"), diethyl carbonate ("DEC"), ethyl methyl carbonate ("EMC"), dipropyl carbonate ("DPC"), methyl propyl carbonate ("MPC"), ethyl propyl carbonate ("EPC"), methyl ethyl carbonate ("MEC"), ethylene carbonate ("EC"), propylene carbonate ("PC"), butylene carbonate ("BC"), and the like may be used, and as the ester solvent, methyl acetate, ethyl acetate, n-propyl acetate, iso-propyl acetate, methyl propionate, ethyl propionate, γ-butyrolactone, decanolide, valerolactone, mevalonolactone, caprolactone, and the like may be used. As the ether solvent, dibutyl ether, tetraglyme, diglyme, dimethoxyethane ("DME"), 2-methyltetrahydrofuran ("2-methyl-THF"), tetrahydrofuran ("THF"), and the like may be used. As the phosphate solvent, triethylphosphine and the like may be used; however, the phosphate solvent is not limited thereto and any suitable aprotic solvent used in the art may be used herein.

Also, as the aprotic solvent, nitriles such as R—CN (R is a $C_2$-$C_{20}$ hydrocarbon group having a linear chain, a branched chain, or a cyclic structure and optionally including an aromatic ring having a double bond or an ether bond), amides such as dimethylformamide ("DMF"), dioxolane such as 1,3-dioxolane, and sulfolane may be used.

The aprotic solvent may be used alone or as a mixture with another aprotic solvent, and when used as a mixture, a mixture ratio may be suitably adjusted according to the desired performance of a battery as known in the art.

Also, the liquid organic electrolyte may include an ionic liquid. As the ionic liquid, a compound including positive ions of linear or branched substituted ammonium, imidazolium, pyrrolidinium, and piperidinium and negative ions of $PF_6^-$, $BF_4^-$, $CF_3SO_3^-$, $(CF_3SO_2)_2N^-$, $(C_2F_5SO_2)_2N^-$, $(C_2F_5SO_2)_2N^-$, and $(CN)_2N^-$ may be used herein.

The liquid organic electrolyte may include a salt of an alkaline metal and/or an alkaline earth metal. The salt of the alkaline metal and/or the alkaline earth metal becomes dissolved in an organic solvent and may act as a source of ions of the alkaline metal and/or the alkaline earth metal. For example, the salt of the alkaline metal and/or the alkaline earth metal may promote movement of ions of the alkaline metal and/or the alkaline earth metal.

For example, positive ions of the alkaline metal and/or the alkaline earth metal may be lithium ions, sodium ions, magnesium ions, potassium ions, calcium ions, rubidium ions, strontium ions, cesium ions, barium ions, and the like.

A negative ion of the salts of the alkaline metal and/or the alkaline earth metal included in the liquid organic electrolyte may be at least one selected from $PF_6^-$, $BF_4^-$, $SbF_6^-$, $AsF_6^-$, $C_4F_9SO_3^-$, $ClO_4^-$, $AlO_2^-$, $AlCl_4^-$, $C_xF_{2x+1}SO_3^-$ (wherein, x is a natural number), $(C_xF_{2x+1}SO_2)(C_yF_{2y+1}SO_2)N^-$ (wherein, x and y are natural numbers), and a halide (such as $F^-$, $Cl^-$, $Br^-$, or $I^-$).

For example, the salts of the alkaline metal and/or the alkaline earth metal may be at least one of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiF, LiBr, LiCl, LiI, and $LiB(C_2O_4)_2$ (lithium bis(oxalato)borate; LiBOB); however, the salts of the alkaline metal and/or the alkaline earth metal are not limited thereto and any material that may be used as the alkaline metal and/or the alkaline earth metal may be used herein.

In the liquid organic electrolyte, the amount of the alkaline metal and/or the alkaline earth metal may be about 100 millimolar ("mM") to about 10 M. In some embodiments, the amount of the alkaline metal and/or the alkaline earth metal may be about 500 mM to about 2 M. However, the amount of the alkaline metal and/or the alkaline earth metal is not limited thereto and any range of the amount of the alkaline metal and/or the alkaline earth metal in which the liquid organic electrolyte may efficiently transfer lithium ions and/or electrons in a charge and discharge process may be used.

Also, an inorganic solid electrolyte membrane, including a lithium ion conductive glass, a lithium ion conductive crystal (ceramic or glass-ceramic), or a combination thereof located on the separator or on the polymer gel electrolyte in the lithium air battery, may be prepared.

For example, in considering chemical stability, the inorganic solid electrolyte membrane may be an oxide. The inorganic solid electrolyte membrane may be any material having a structure of LISICON (lithium super-ion-conductor).

For example, a lithium ion conductive crystal may be $Li_{1+x+y}(Al, Ga)_x(Ti, Ge)_{2-x}Si_yP_{3-y}O_{12}$ (wherein, $0 \le x \le 1$, $0 \le y \le 1$, for example, $0 \le x \le 0.4$, $0 \le y \le 0.6$, or $0.1 \le x \le 0.3$, $0.1 \le y \le 0.4$). The lithium ion conductive glass-ceramic may be lithium-aluminum-germanium phosphoric acid ("LAGP"), lithium-aluminum-titanium-phosphoric acid ("LATP"), lithium-aluminum-titanium-silicon-phosphoric acid ("LATSP"), and the like.

The inorganic solid electrolyte membrane may further include the polymer gel electrolyte in addition to the glass-ceramic.

The inorganic solid electrolyte membrane may further include other solid electrolyte materials than the glass-ceramic. The other solid electrolyte materials may include $Cu_3N$, $Li_3N$, LiPON (lithium phosphorous oxynitride), and the like.

In the lithium air battery, a thickness of the inorganic solid electrolyte membrane may be about 0.5 μm to about 300 μm. When the thickness of the inorganic solid electrolyte membrane is too high, there may be a problem in lithium ion conductivity, and the energy density of the lithium air battery may decrease due to an increase in weight of the lithium air battery.

Thereafter, the negative electrode is provided on a surface of a case, the separator is provided on the polymer gel electrolyte, a second polymer gel electrolyte is optionally provided on the separator, and the positive electrode is provided on the second polymer gel electrolyte. Thereafter, a porous current collector is located on the positive electrode, and a battery is immobilized by compressing the battery by using a compressor where air may be transferred to the positive electrode, thereby completing the lithium air battery.

The case may be separated into an upper portion contacting the negative electrode and a bottom portion contacting the positive electrode, and an insulating resin is disposed between the upper portion and the bottom portion such that the positive electrode and the negative electrode are electrically insulated.

The lithium air battery may be used in a lithium primary battery and a lithium secondary battery. Also, a shape of the lithium air battery is not particularly limited, for example, the shape of the lithium air battery may be a coin, a button, a sheet, a laminate, a cylinder, flat, a cone, and the like. Also, the lithium air battery may be used in a large battery used in EVs and the like.

Figure 2:
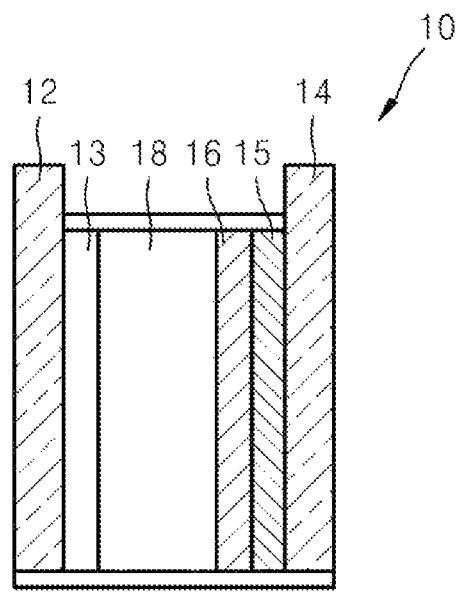
FIG. 2 schematically illustrates a structure of a lithium air battery according to an embodiment.

FIG. 2 schematically illustrates an embodiment of a lithium air battery 10. The lithium air battery 10 includes a polymer gel electrolyte 18 between a positive electrode 15 that uses oxygen formed in a primary current collector 14 as an active material and a negative electrode 13 including lithium close to a secondary current collector 12, wherein a separator 16 is formed on a surface of the positive electrode 15. On a surface of the polymer electrolyte 18 and/or the separator 16, a solid electrolyte membrane (not shown) may be disposed. The primary current collector 14 is porous and may act as a gas diffusion layer capable of diffusing air.

The term "air" as used herein is not limited to atmospheric air, and may include gas including oxygen, or pure oxygen gas. A broad definition of "air" may apply for all purposes, for example, the definition may apply to an air battery, an air electrode, and the like.

Hereinafter, the present inventive concept will be described in greater detail with reference to examples and comparative Examples. However, embodiments described herein should be considered in a descriptive sense only and not for purposes of limitation.

Preparing a Polymer Gel Electrolyte

PREPARATION EXAMPLE 1

In polyethylene oxide powder (Aldrich, average molecular weight $6\times10^5$), 5 wt % of $SiO_2$ (diameter of about 10 to about 20 nm, Kanto Chemicals) was added, mixed, and dispersed in an acetonitrile ("AN") solvent to produce a mixture. 1 M solution of $Li(CF_3SO_2)_2N$(LiTFSI, Wako) was added to the mixture in a molar ratio of Li/O of 1/18, and the mixture was agitated for 24 hours to prepare a gel solution. The gel solution was casted on a Teflon dish, dried for 24 hours at a temperature of 20° C., AN solvent was removed, and the gel solution was dried for 12 hours at a temperature of 80° C. to obtain a PEO18LiTFSI—$SiO_2$ polymer electrolyte sheet. An average thickness of the PEO18LiTFSI—$SiO_2$ polymer electrolyte sheet was 60 μm. In the PEO18LiTFSI—$SiO_2$ polymer electrolyte sheet, 1,2-dimethoxyethane ("DME") solution where 1 M of LiTFSI is dissolved was impregnated to prepare a polymer gel electrolyte sheet.

PREPARATION EXAMPLE 2

A polymer gel electrolyte sheet was prepared in the same manner as in Synthesis Example 1, except for using 5 wt % of $BaTiO_3$ (average diameter 100 nm, Aldrich) instead of 5 wt % of $SiO_2$.

PREPARATION EXAMPLE 3

A polymer gel electrolyte sheet was prepared in the same manner as in Synthesis Example 1, except for using diglyme instead of the DME as a solvent.

PREPARATION EXAMPLE 4

A polymer gel electrolyte sheet was prepared in the same manner as in Synthesis Example 1, except for using triglyme instead of the DME as a solvent.

PREPARATION EXAMPLE 5

A polymer gel electrolyte sheet was prepared in the same manner as in Synthesis Example 1, except for using tetraglyme instead of the DME as a solvent.

COMPARATIVE PREPARATION EXAMPLE 1

A polymer gel electrolyte sheet without a solvent was prepared by preparing a polymer gel electrolyte sheet in the same manner as in Synthesis Example 1, except for using AN instead of the DME as a solvent.

COMPARATIVE PREPARATION EXAMPLE 2

A polymer gel electrolyte sheet was prepared in the same manner as in Synthesis Example 1, except for using propylene carbonate ("PC") instead of the DME as a solvent.

COMPARATIVE PREPARATION EXAMPLE 3

A polymer gel electrolyte sheet was prepared in the same manner as in Synthesis Example 1, except for using polyethylene glycol dimethyl ether ("PEGDME") having a molecular weight of 500 instead of the DME as a solvent.

COMPARATIVE PREPARATION EXAMPLE 4

A polymer gel electrolyte sheet was prepared in the same manner as in Synthesis Example 1, except for using N-methyl-N-propylpiperidinium bis(trifluoromethanesulfonyl)imide ("PP13TFSI") as a solvent instead of the DME as a solvent.

Preparing a Lithium Symmetric Cell

EXAMPLE 1

Figure 3:
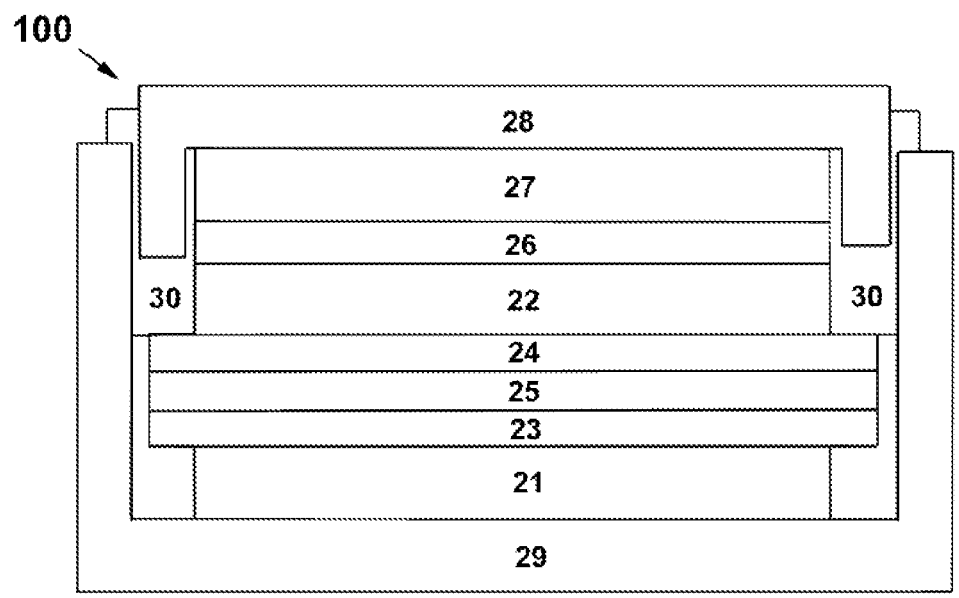
FIG. 3 schematically illustrates a structure of a lithium symmetric cell manufactured in Example 1.

As shown in FIG. 3, in a stainless case 29 that is a coin cell body, a primary lithium electrode 21 (diameter of 15 millimeters ("mm"), thickness of 500 μm), a primary polymer gel electrolyte sheet 23 (diameter of 19 mm, thickness of 60 μm) prepared as in Preparation Example 1, a separator 25 (Celgard 3501), a secondary polymer gel electrolyte sheet 24 (diameter of 19 mm, thickness of 60 μm) prepared as in Preparation Example 1, and a secondary lithium electrode 22 (diameter of 15 mm, thickness of 500 μm) were sequentially layered. Thereafter, on the secondary lithium electrode 22, a spacer 26 having a thickness of 1 t (1 mm) prepared from an SUS material was layered, a spring 27 was provided on the spacer 26, and a coin cell cap 28 was provided to immobilize a coin cell to prepare a symmetric coin cell 100.

The coin cell 100 may be separated into an upper portion contacting the secondary lithium electrode 22 and a bottom portion contacting the primary lithium electrode 21, and a gasket 30 prepared from an insulating resin material is disposed between the upper portion and the bottom portion so that the primary lithium electrode 21 and the secondary lithium electrode 22 are electrically insulated.

EXAMPLES 2 to 5

A lithium symmetric cell was prepared in the same manner as in Example 1, except for using the polymer gel electrolytes of Preparation Examples 2 to 5, respectively.

COMPARATIVE EXAMPLES 1 to 4

A lithium symmetric cell was prepared in the same manner as in Example 1, except for using the polymer gel electrolytes of Comparative Preparation Examples 1 to 4, respectively.

EVALUATION EXAMPLE 1

Evaluation of Stability of Solvent

A reduction potential of lithium metal in a liquid solvent was calculated by using Ab-initio DFT and continuum salvation model ("PCM"). Results of calculations are shown in Table 1. The reduction potential of lithium metal in a liquid solvent was calculated by using Formula 2 below.

$$RP(\text{solution}) = -EA(g) - \Delta E_M(\text{solv.}) + \Delta E_M^-(\text{solv.}) \quad \text{Formula 2}$$

In Formula 2,

RP(solution) is a reduction potential of solvent molecules in a liquid state,

EA(g) is electron affinity of the solvent molecules in a gaseous state, $\Delta E_M$(solv.) is a solvation energy of the solvent molecules, and $\Delta E_M^-$(solv.) is a solvation energy of a solvent anion.

TABLE 1

| Organic solvent | Potential (V) [vs. Li/Li$^+$] |
|---|---|
| 1,4-dioxane | −1.95 |
| triethylamine | −1.88 |
| 1,2-dimethoxyethane | −1.68 |
| diethyl ether | −1.64 |
| diglyme | −1.56 |
| triglyme | −1.55 |
| tetrahydropyran | −1.52 |
| diisopropyl ether | −1.50 |
| tetraglyme | −1.49 |
| 1,3-dioxolane | −1.48 |
| tetrahydrofuran | −1.43 |
| 2,5-dimethyltetrahydrofuran | −1.42 |
| 2,2-dimethyltetrahydrofuran | −1.40 |
| 2-methyltetrahydrofuran | −1.38 |
| Hexamethylphosphoric triamide | −1.16 |
| o-dimethoxybenzene | −1.02 |
| diethyl carbonate | −1.01 |
| anisole | −0.89 |
| dimethyl carbonate | −0.86 |
| N,N-diethylacetamide | −0.63 |
| tetramethylurea | −0.53 |

As shown in Table 1, the solvents of Table 1 have a reduction potential of −0.5 V or less with respect to the lithium metal. Hence, to reduce the solvents, an overpotential of 0.5 V or greater is required with respect to the lithium metal. Accordingly, a lithium electrode having an overpotential of 0.5 V or less is electrochemically stable.

EVALUATION EXAMPLE 2

Evaluation of Ion Conductivity and Viscosity of Solvent

Ionic conductivity and viscosity of an organic solvent where a lithium salt is dissolved having a composition of Table 2 were measured and results thereof are shown in Table 2.

TABLE 2

| Organic solvent where a lithium salt is dissolved | Ionic conductivity at a temperature of 21° C. [mS/cm] | Viscosity at a temperature of 21° C. [Pa × s] |
|---|---|---|
| 1M LiTFSI/DME | 13.69 | 0.00146 |
| 1M LiTFSI/TEGDME | 2.72 | 0.0131 |
| 1M LiTFSI/PEGDME | 0.5899 | 0.0897 |
| 1M LiTFSI/THF | 10.86 | 0.00143 |
| 1M LiTFSI/2m-THF | 2.18 | 0.0015 |
| 1M LiTFSI/22dm-THF | 0.3723 | 0.002 |
| 1M LiTFSI/25dm-THF | 0.1847 | 0.0014 |
| 0.5M LiTFSI/TEGDME | 1.94 | 0.00635 |
| 1M LiTFSI/TEGDME | 2.72 | 0.0131 |
| 2.0M LiTFSI/TEGDME | 1.53 | 0.0639 |
| 3.0M LiTFSI/TEGDME | 0.00125 | 1.16 |
| 1M LiI/TEGDME | 1.63 | 0.014 |
| 1M LIBF4/TEGDME | 1.08 | 0.00925 |
| 1M LiTFSI/TEGDME | 2.72 | 0.0131 |

As shown in Table 2, DME, TEGDME, tetrahydrofuran ("THF"), 2-methyltetrahydrofurn ("2m-THF"), 2,2-dimethyltetrahydrofuran ("22dm-THF"), and 2,5-dimethyltetrahydrofuran ("25dm-THF") showed viscosity of 0.02 Pa×s or less and ion conductivity of 0.18 mS/cm or greater at a concentration of LiTFSI lithium salt of 1.5 M or less.

Tetraglyme had high viscosity while lithium salts such as LiI and LiBF$_4$ showed low ionic conductivity.

EVALUATION EXAMPLE 3

Measurement of Physical Properties of Polymer Gel Electrolyte

Ionic conductivity (σ), lithium ion transference number ($t_{Li}$), and lithium ion mobility ($\mu_+$) at a temperature of 21° C. with respect to the polymer gel electrolytes prepared in Synthesis Examples 1 to 5 and Comparative Synthesis Examples 1 to 4 were measured and some of the results thereof are shown in Table 3.

The ionic conductivity, the lithium ion transference number, and the lithium ion mobility may be calculated from Formulas 3 to 5, respectively. Values needed for calculating the ionic conductivity, the lithium ion transference number, and the lithium ion mobility were used by measuring an impedance and a time dependent current decay of an input voltage with respect to a lithium symmetric cell or an SUS symmetric cell.

$$\sigma = I/(R_b \cdot A) \quad \text{Formula 3}$$

In Formula 3,
I is a thickness of the polymer gel electrolyte,
A is a surface area of the cell, and
$R_b$ is an impedance of the polymer gel electrolyte.

$$t_{Li} = \frac{I_{ss}(V - I_0 R_0)}{I_0(V - I_{ss} R_{ss})} \quad \text{Formula 4}$$

In Formula 4,
$I_o$ is an initial current,
$I_{ss}$ is a steady state current,
$R_o$ is an initial resistance, and
$R_{ss}$ is a steady state resistance.

$$\mu_+ = t_{Li} \cdot \sigma/(N_A e C_0) = t_{Li} \cdot \sigma/(F C_0) \quad \text{Formula 5}$$

In Formula 5,
$t_{Li}$ is a lithium ion transference number,
σ is ionic conductivity of polymer gel electrolyte, and
$FC_0$ is a quantity of electric charge according to a lithium ion concentration (M).

TABLE 3

| | Ion conductivity [mS/cm] | Lithium ion transference number | Lithium ion mobility [cm$^2$/V × sec] |
|---|---|---|---|
| Example 1 | 6.49 | 0.21 | 1.36 × 10$^{-3}$ |
| Example 5 | 1.77 | 0.6 | 1.05 × 10$^{-3}$ |
| Comparative Example 1 | 0.29 | — | — |
| Comparative Example 2 | 2.95 | 0.35 | 1.03 × 10$^{-3}$ |
| Comparative Example 3 | 0.78 | 0.33 | 0.26 × 10$^{-3}$ |

As shown in Table 3, the lithium batteries of Examples 1 to 5, including the polymer gel electrolytes of Preparation Examples 1 to 5, showed improved ion conductivity and lithium ion mobility compared to those of the lithium batteries of Comparative Examples 1 to 3, including the polymer gel electrolytes of Comparative Preparation Examples 1 to 3.

EVALUATION EXAMPLE 4

Evaluation of Lifespan of Lithium Battery

The lithium symmetric cells prepared in Examples 1 to 5 and Comparative Examples 1 to 4 were charged and discharged by applying a constant current of 0.2 mA/cm$^2$ for 1 hour at a temperature of 60° C. (formation process).

After the formation process, a constant current of 3 mA/cm$^2$ was applied to the lithium symmetric cells for 4 hours per charge or discharge, a charge and discharge was repeated for 100 times or more, and a change in overpotential of the lithium symmetric cells was observed. Some of the results of the change in overpotential of the lithium symmetric cells is shown in Table 4 and FIG. 4. A result of an experiment of the lithium battery of Example 1 is illustrated in FIG. 4.

TABLE 4

| | Overpotential in 7$^{th}$ cycle [V] |
|---|---|
| Example 1 | 0.01 |
| Example 2 | 0.03 |
| Example 3 | 0.11 |
| Example 4 | 0.15 |
| Example 5 | 0.19 |
| Comparative Example 1 | 0.2 or greater |
| Comparative Example 2 | 0.2 or greater |
| Comparative Example 3 | 0.2 or greater |
| Comparative Example 4 | 0.2 or greater |

Figure 4:
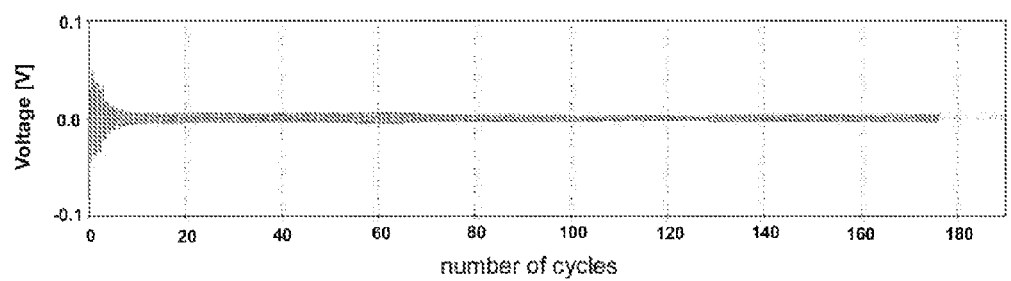
FIG. 4 is a graph showing a change in overpotential of a lithium symmetric cell of Example 1 according to the number of cycles.

As shown in Table 4 and FIG. 4, the lithium symmetric batteries of Examples 1 to 5 showed a reduced overpotential and an increased lifespan compared to that of the lithium symmetric batteries of Comparative Examples 1 to 4.

In particular, as illustrated in FIG. 4, the lithium battery of Example 1 had a very low overpotential of 30 mV or less even in 150 cycles or greater.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A lithium air battery comprising:
   a negative electrode comprising a lithium metal or a lithium alloy;
   a positive electrode comprising air as a positive electrode material; and
   a polymer gel electrolyte contacting the negative electrode,
   wherein the polymer gel electrolyte has
      an ionic conductivity of 10$^{-3}$ Siemens/centimeter or greater,
      a lithium ion transference number of 0.15 or greater, and
      a lithium ion mobility of 10$^{-6}$ centimeters$^2$/Volt×second or greater,
   wherein the polymer gel electrolyte comprises
      a lithium salt,
      a polymer capable of forming a complex with the lithium salt,
      an insulating inorganic filler, and
      a non-carbonate organic solvent,
   wherein the organic solvent is at least one selected from 1,4-dioxane, triethylamine, 1,2-dimethoxymethane, diethyl ether, diglyme, triglyme, tetrahydropyran, diisopropyl ether, tetraglyme, 1,3-dioxolane, tetrahydrofuran, 2-methyltetrahydrofuran, 2,2-dimethyltetrahydrofuran, 2,5-dimethyltetrahydrofuran, hexamethylphosphoric triamide, o-dimethoxybenzene, tetraglyme, anisole, N, N-diethyl acetamide, and tetramethylurea,
   wherein an anionic radius of the lithium salt is 2.5 Angstroms or greater,
   wherein a molecular weight of all of the lithium salt is 145 or greater, and
   wherein a viscosity of a solution of the lithium salt in the organic solvent is about 0.02 Pascal×second or less at a concentration of the lithium salt of 1.5 moles per liter or less and at a temperature of 21° C.,
   wherein the positive electrode is free of TiS$_2$, LiMnO$_2$, LiMn$_2$O$_4$, V$_2$O$_5$, CoS$_x$ (wherein, 0.8<x<4.5), NiS$_x$ (wherein, 0.8<x<4.5), V$_3$O$_{16}$, FeS, and FeS$_2$.

2. The lithium air battery of claim 1, wherein a reduction potential of the organic solvent in a liquid state with respect to the lithium metal is −0.5 Volts or less.

3. The lithium air battery of claim 1, wherein the polymer gel electrolyte comprises PEO$_{18}$Li(CF$_3$SO$_2$)$_2$N.

4. The lithium air battery of claim 1, wherein an ionic conductivity of the organic solvent is 0.18 milliSiemens/centimeter or greater at a concentration of the lithium salt of 1.5 moles per liter or less and at a temperature of 21° C.

5. The lithium air battery of claim 1, wherein the lithium salt is at least one selected from Li(FSO$_2$)$_2$N, Li(CF$_3$SO$_2$)$_2$N, Li(C$_2$F$_5$SO$_2$)$_2$N, LiN(C$_p$F$_{2p+1}$SO$_2$)(C$_q$F$_{2q+1}$SO$_2$) (wherein p and q are different from each other, and p and q are each independently an integer of 1 to 20), LiN((SO$_2$)$_2$C$_p$F$_{2p}$) (wherein, p is an integer of 1 to 10), Li(C$_6$F$_5$SO$_2$)$_2$N, Li(C$_{10}$F$_7$SO$_2$)$_2$N, Li(C$_6$F$_5$SO$_2$)(C$_{10}$F$_7$SO$_2$)N, LiN(C$_6$F$_5$SO$_2$)(C$_p$F$_{2p+1}$SO$_2$) (wherein, p is an integer of 1 to 10), LiN(C$_{10}$F$_7$SO$_2$)(C$_p$F$_{2p+1}$SO$_2$) (wherein, p is an integer of 1 to 10), LiC$_4$F$_9$SO$_3$, Li(CF$_3$SO$_2$)$_3$C, Li(C$_6$H$_5$)$_4$B, and LiC$_4$BO$_8$.

6. The lithium air battery of claim 1, wherein the polymer is at least one selected from a polyethylene oxide, a polypropylene, a polyacrylonitrile, a polyvinylidene-fluoride, and a polymethylmethacrylate.

7. The lithium air battery of claim 1, wherein a molecular weight of the polymer is about 1×10$^5$ to about 1×10$^7$.

8. The lithium air battery of claim 1, wherein a diameter of the insulating inorganic filler is about 100 nanometers or less.

9. The lithium air battery of claim 1, wherein an amount of the insulating inorganic filler is about 10 weight % or less based on a total weight of the polymer and the inorganic filler.

10. The lithium air battery of claim 1, wherein the insulating inorganic filler is at least one selected from SiO$_2$, BaTiO$_3$, TiO$_2$, Al$_2$O$_3$, and Li$_2$CO$_3$.

11. The lithium air battery of claim 1, wherein
    an ionic conductivity of the polymer gel electrolyte is about 2×10$^{-3}$ Siemens/centimeter or greater,
    a lithium ion transference number is about 0.16 or greater, and a lithium ion mobility is about $1.1 \times 10^{-6}$ centimeters$^2$/Volt×second or greater.

12. The lithium air battery of claim 1, further comprising a separator disposed between the positive electrode and the negative electrode.

13. The lithium air battery of claim 1, wherein the positive electrode and the negative electrode each comprise the lithium metal and an overpotential of the lithium battery is about 0.2 Volts or less after 100 cycles of charge and discharge under a condition of a constant current of about 3 milliAmpere/centimeter$^2$ for about 4 hours per charge or discharge at a temperature of about 60° C.

* * * * *